UNITED STATES PATENT OFFICE.

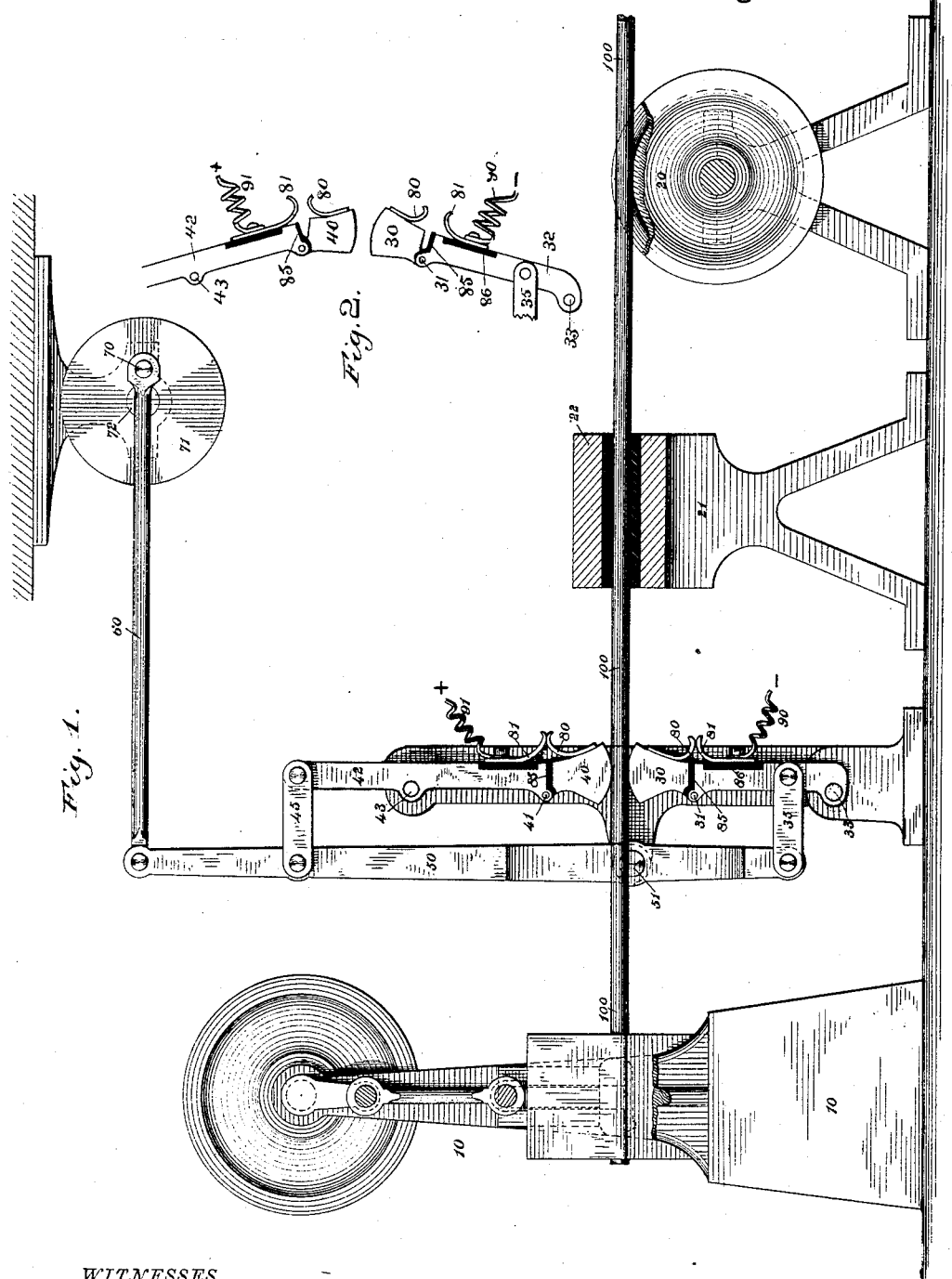

GEORGE D. BURTON, OF BOSTON, MASSACHUSETTS.

ELECTRIC BAR HEATING AND FEEDING APPARATUS FOR FORGING-MACHINES.

SPECIFICATION forming part of Letters Patent No. 435,111, dated August 26, 1890.

Application filed June 9, 1890. Serial No. 354,718. (No model.)

*To all whom it may concern:*

Be it known that I, GEORGE D. BURTON, a citizen of the United States of America, residing at Boston, in the county of Suffolk and State of Massachusetts, have invented certain new and useful Improvements in Electric Bar Heating and Feeding Apparatus for Forging-Machines, of which the following is a specification.

This invention relates to an apparatus for use in connection with forging-machines for heating the bar of material from which articles are to be forged, such as spikes, nails, bolts, screws, coupling-pins, or other articles.

The object of the invention is to provide an apparatus which will quickly and economically heat the bar to a forging temperature without withdrawal thereof from the machine.

Figure 1 of the accompanying drawings represents a side elevation of a forging-machine and this improved bar heating and feeding apparatus in connection therewith. Fig. 2 is a side elevation of the gripping-jaws and their supporting-levers in open position.

Similar numerals of reference indicate corresponding parts in both figures.

This improved bar heating and feeding apparatus is illustrated in connection with a drop-press 10 for producing drop-forgings; but it may be applied to or in connection with any other forging-machine to which it may be a useful adjunct. The bar or rod 100, from which the forgings are to be made, may be supported on a roll 20 and passed through a guide 21, having an insulated eye 22. The bar heater and feeder is disposed between the forging-machine 10 and the guide 21, and comprises two hinged gripping-jaws 30 and 40, actuators therefor, and an electric circuit for passing a current through the jaws. The jaws 30 and 40 are composed of copper or other material which is a good conductor of electricity, and are provided with arc-shaped gripping-faces. The lower jaw 30 is connected by a hinge 31 with the upper end of a lever 32, which oscillates on a pivot 33, and the upper jaw 40 is connected by a hinge 41 with the lower end of the lever 42, which oscillates on a pivot 43. The ends of the levers serve as stops to limit the swing of the jaws on their pivots. Both these levers are connected by links 35 and 45, respectively, with a long actuating-lever 50, which is pivoted at 51 to a suitable support. A pitman 60 is connected at one end to the upper end of the actuating-lever 50 and at the other end to a wrist-pin 70 of a crank-wheel 71, disposed on a counter-shaft 72, to which motion is communicated by any suitable means. Each of the pivoted jaws 30 and 40 is provided with a contact-spring 80, attached to its front side, and similar contact-springs 81 are attached to the levers 32 and 42 in such positions that the contact-springs of the levers and jaws meet when the jaws grasp the bar. Electric conductors 90 and 91, leading from a dynamo-electric machine or other suitable source of electricity, are connected with the springs 81, attached to the levers. The contact-springs 80 and 81 constitute circuit-closers for passing a current of electricity through the jaws. When the levers 32 and 42 are composed of metal, insulators 85 are interposed between them and the jaws, and the springs 81 rest on insulating-plates 86, attached to the levers.

The operation is as follows: The bar 100, from which the articles are to be forged, is passed through the eye of the guide 21 and between the feeding and heating jaws 30 and 40. The jaws being in the position illustrated in the drawings, the contact-springs 80 and 81 close the circuit, and an electric current adapted to heat the portion of the bar to be forged and soften it sufficiently for the forging operation is passed through the jaws and through that portion of the bar between the jaws. The actuating-lever 50 is oscillated to cause a feeding of the bar to the forging-machine at proper intervals. When the adjacent ends of the jaw-levers 32 and 42 move to the right through arcs of circles under the influence of said actuating-lever, the jaws 30 and 40 release their grip on the bar 100 and turn slightly on their hinges, whereby the contact-springs 80 and 81 are separated and the current broken during the backward stroke of the jaws. When the adjacent ends of the jaw-levers swing toward the forging-machine, the jaws grip the bar and feed it toward the machine, and the contact-springs meet and close the circuit, whereby another portion of the bar is heated for a subsequent forging operation.

I claim—

1. In a bar heating and feeding apparatus, the combination of movable electro-conductive feed-jaws provided with automatic circuit-closers, and electric conductors in connection therewith.

2. In a bar heating and feeding apparatus, the combination of two pivoted jaw-levers, two jaws hinged to the adjacent ends thereof, and contact-springs on said levers and jaws.

3. In a bar heating and feeding apparatus, the combination of two pivoted jaw-levers, two jaws hinged to the adjacent ends thereof, contact-springs on said levers and jaws, an actuating-lever for said jaw-levers, and links connecting said jaw-levers with said actuating-lever.

4. In a bar heating and feeding apparatus, the combination of two pivoted jaw-levers, two jaws hinged to the adjacent ends thereof and having stops to limit their movements, springs on said levers and jaws, adapted for contact when the jaws are closed, and electric conductors connected with the springs on the levers.

5. In a bar heating and feeding apparatus, the combination of two pivoted jaw-levers, two jaws hinged to the adjacent ends thereof, springs on said levers and jaws, adapted for contact when the jaws are closed, insulators between the levers and their springs, and electric conductors connected with the insulated springs.

GEO. D. BURTON.

Witnesses:
CHESTER MARR,
R. W. GALLUPE.